Nov. 2, 1926.
G. FORNACA
GEAR CUTTING MACHINE
Filed Sept. 22, 1924    2 Sheets-Sheet 1
1,604,984
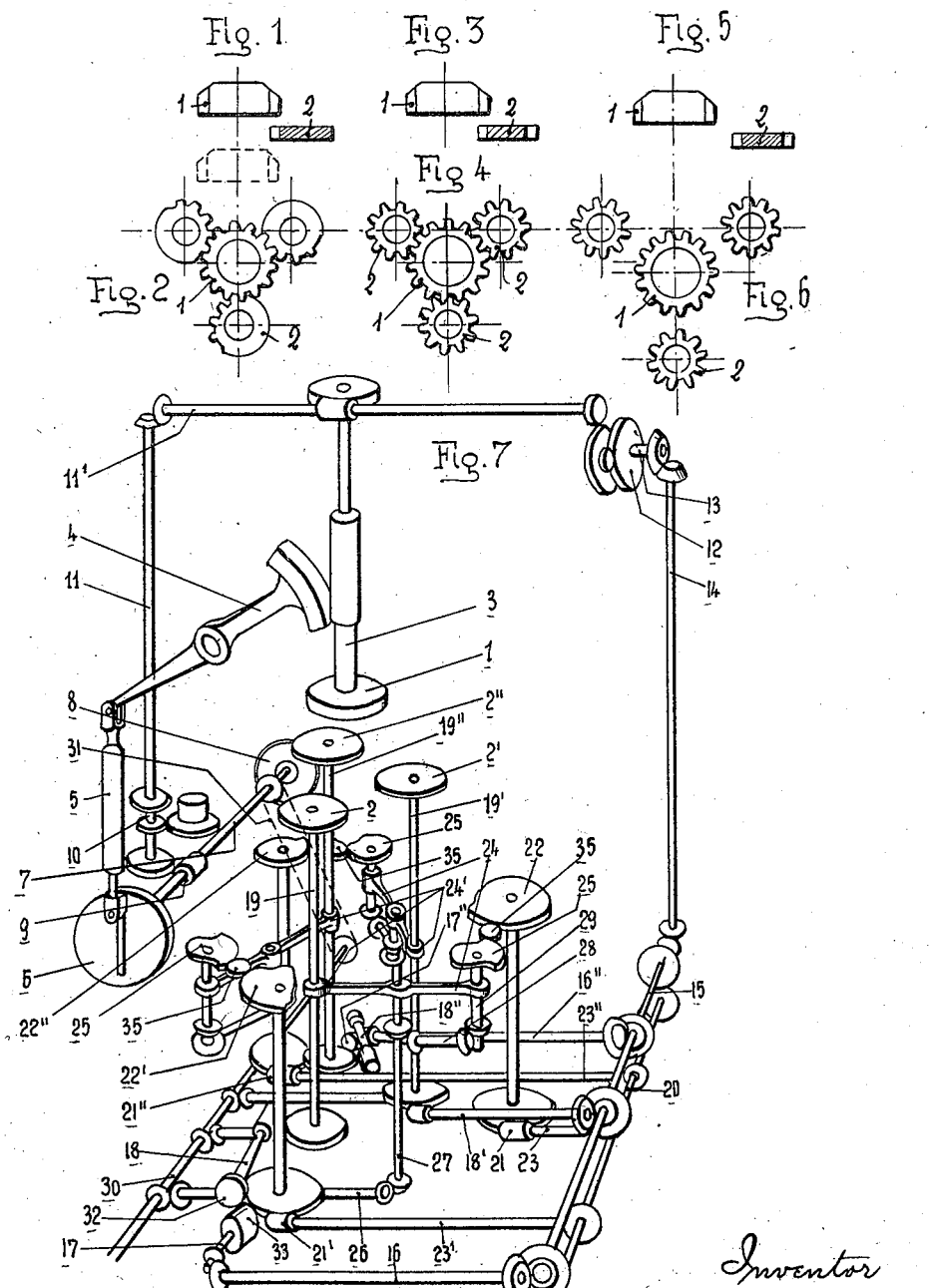

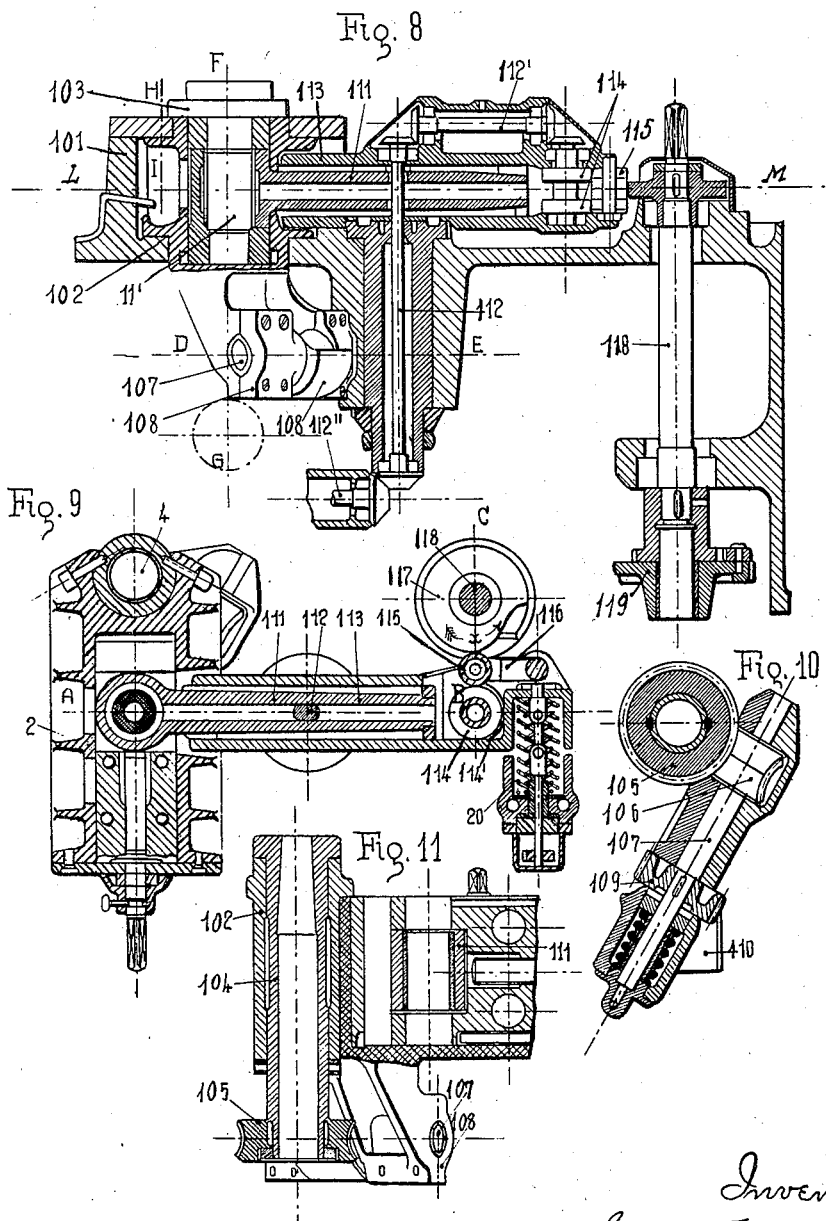

Patented Nov. 2, 1926.

1,604,984

UNITED STATES PATENT OFFICE.

GUIDO FORNACA, OF TURIN, ITALY.

GEAR-CUTTING MACHINE.

Application filed September 22, 1924, Serial No. 739,203, and in Italy December 12, 1923.

This invention relates to that type of gear cutting machine having a reciprocable toothed cutter and means for simultaneously rotating said cutter and the gear blank to be cut.

I provide an improved machine of this type constructed to operate simultaneously on a plurality of independently supported gear blanks or independently supported sets of gear blanks.

A feature of the invention consists in the provision of means whereby each blank to be cut receives three combined movements, namely, an alternating rectilinear movement directed along a line radial to the cutter, whereby the blank is brought into working position at each cutting stroke and is moved clear at each return stroke of the cutter; a movement of rotation in such ratio to the rotary movement of the cutter that the blank and the cutter turn together as if they were effectively in mesh; and a progressive feed movement radially towards the cutter.

There may be any number of gear blank supports or holders grouped around the gear cutter. In one construction, each such support is carried by a slide movable radially relative to the axis of the cutter under the control of a composite beam, one part of which is pin jointed to the slide while the other is provided with a double eccentric arranged to rotate synchronously with the reciprocal movements of the cutter to effect oscillation of the beam through the medium of a rocker shaft bearing on the periphery of a cam, said cam being rotated to produce a radial feed movement of the gear blank support, which feed movement is superposed on the alternating movement of said support imparted by the double eccentric.

Preferably, the rocker shaft carries three ball bearings, two of which engage the double eccentric, while the third bears on the periphery of the cam.

In addition to the aforesaid movements of the gear blank supports, which are obtained automatically during the operation of the machine, provision may also be made for effecting movement of said supports by hand as required for initially setting the supports and blanks thereon relative to the cutter.

The accompanying drawings show, by way of example, a diagram of the relative movements to the tool and the blanks to be cut in different phases of operation; a general diagram of the mechanism; and one constructive form of some essential parts.

Fig. 1 shows the relative positions of the gear cutter and a gear blank during the first operative stage.

Fig. 2 is a plan showing the cutter at this stage operating simultaneously on three gear blanks supported independently of one another.

Fig. 3 is a diagram analogous to Figure 1 and representing the second or finishing stage, the blank having been advanced radially towards the cutter until the pitch circles of the gear teeth and of the teeth formed on the blank are coincident.

Fig. 4 is a plan showing the cutter at this stage operating simultaneously on three gear blanks as in Figure 2.

Figs. 5 and 6 are views similar to Figures 3 and 4 respectively but with the finished gears moved radially away from the gear cutter.

Fig. 7 is a diagram of the mechanism.

Fig. 8 is a longitudinal section on the line A B C of Figure 9.

Fig. 9 is a horizontal section on the line L M of Figure 8.

Fig. 10 is a horizontal section on the line D E of Figure 8.

Fig. 11 is a section on the line F G of Figure 8.

In the drawings, 1 indicates the gear cutter having teeth the profile of which conforms to the profile of the teeth to be cut on the gear blanks 2. The cutter is arranged to be rotated, and simultaneously reciprocated between the positions indicated in full and in dotted lines, Fig. 1.

Each blank to be cut receives three combined movements, namely, an alternating rectilineal movement directed along a line radial to the cutter, whereby the blank is brought into working position at each cutting stroke and is moved clear at each return stroke of the cutter; a movement of rotation in such ratio to the rotary movement of the cutter that the blank and the cutter turn together as if they were effectively in mesh; and a progressive feed movement radially towards the cutter.

After all the teeth have been rough cut on the blank (i. e. after one complete revolution of the blank), the latter is fed nearer to the centre of the gear cutter until the pitch circles coincide exactly (Figs. 3 and 4) and then, by continuing the operation already described, another thin layer of metal is removed to finish the gear on the next complete turn of the blank.

The work described above for one gear is effected under this invention simultaneously and automatically on a plurality of blanks (three in the example shown). When the work is completed, the gears recede automatically from the cutter (Figs. 5 and 6) and the machine stops.

Figure 7 illustrates diagrammatically how the required movements are obtained in a triple gear cutting machine. The cutter 1 is secured to a chuck or holder 3 which receives a vertical reciprocatory motion from a beam 4 actuated by a connecting rod 5 and an adjustable crank 6 from a driving shaft 7 having a driving pulley 8. On the shaft 7 is a worm 9, which, by means of interchangeable gears 10, drives the shafts 11, 11'. From the shaft 11' rotary motion is transmitted to the chuck 3 through worm gearing. Thus the cutter 1 is reciprocated and rotated simultaneously.

Motion is also transmitted from the shaft 11' through a second set of interchangeable gears 12 and shafts 13, 14, 15, 16, 17, 18 to a chuck or support 19 carrying the blank 2 to be cut.

From the shaft 15 rotary motion is also transmitted through a shaft 18' to a second chuck or support 19' carrying a blank 2', and through shafts 16", 17", 18" to a third chuck or support 19" carrying a blank 2".

The shafts 16, 18', 16" have equal speeds in order simultaneously to cut gears of the same size, or, if different sizes are required, their relative speeds may be varied by the aid of interchangeable gears.

Shaft 15 is geared to a shaft 20 which, (through countershafts 23, 23', 23" and worm wheels 21, 21', 21") operates cams 22, 22', 22", one for each blank support. The cams 22, 22', 22", act through three rollers 35 on the arms 24 of three crank levers which, by means of their arms 24' feed the blanks 2, 2', 2", radially towards the cutter 1.

An intermittent to and fro radial movement is also imparted to the blanks by the rotation of the cams 25, at the same speed as the eccentric 6, through the medium of transmission mechanism 26, 27, 28, 29 actuated from the shaft 30 which is driven by a chain 31 from the shaft 7.

The two radial movements of the blank supports due to the cams 22, 25 are superposed one on the other, and the shafts 18, 18', 18" participate in these movements, the teeth of the wheels 33 being made sufficiently wide to maintain the pinions 32 in mesh and the teeth being of helicoidal form so that the displacement takes place without producing any variation in the speed of rotation.

Figures 8 to 11 show some essential parts of the machine. Reference 101 denotes the machine framework in which is a slide 102, directed radially towards the axis of the chuck or holder of the gear cutter and provided with a work holder 103, on which is fixed the blank to be cut. Extending downwards from the work holder is a shaft 104, on the end of which is a helicoidal wheel 105 operated by a two piece globoidal screw 106 fixed on a shaft 107 mounted in a bearing 108 forming part of the slide 102. On the shaft 107 there is a gear 109 meshing with another gear 110 (Fig. 10) mounted on a shaft directed radially towards the axis of the cutter holder.

The inclination of the teeth of the gear 109 is such that at the point of mesh its teeth are parallel to the generating line of the gear 110, so that the teeth of this latter will be spur instead of helicoidal and the gear 109 will thus be capable of displacement parallel to the axis of the gear 110 without getting out of mesh and without acquiring, by its displacement, any positive or negative acceleration of rotation.

Thus the radial movements of the work holder 103 will have no influence on its rotation and on the rotation of the blank which it supports.

These radial movements are imparted by means of a beam 111 pin-jointed to the slide 102 and oscillatable about a shaft 112. The beam 111 is supplemented by a sleeve 113, at one end of which is mounted a double eccentric 114 arranged to be rotated by transmission mechanism 112, 112', 112".

Said double eccentric 114 is provided with projections 114' intended to co-operate with a rocker arm 116 supporting three ball bearing rollers 115, two of which engage the double eccentric 114, while the third co-operates with a cam 117 which is keyed on a shaft 118 driven through a gear wheel 119. The sleeve 113 is subjected to the action of a spring 120 which presses the double eccentric 114 and the intermediate roller 115 towards the cam 117.

The operation is as follows:—

The work holder 103 rotates on itself and succesively presents all the points of the blank to the action of the cutter, and the cam 117 rotates at a slightly less speed in the direction of the arrow $x$, while the double eccentric 114 also rotates but at a speed synchronous with the strokes of the cutter, so that each time the cutter is about to begin its descending stroke, the projections 114' of the eccentric will be in engagement with the rollers 115, whereby the beam 111 with the sleeve 113 will be turned about the shaft 112 to move the blank towards the cutter and maintain it in this position until the cutter is about to start its return stroke. At this moment the projections 114' leave the rollers 115 and the spring 120 then causes the beam to turn in the opposite direction whereby the blank is moved clear of the cutter.

The effect of the cam 117 is to superpose a progressive feed movement on the work holder 103 on the forward movements of the latter under the action of the double eccentric 114.

Assume that the cam 117 is at the beginning of its rotation, that is displaced 90° in a clockwise direction, Fig. 9, then the cam engaging the roller 115 will be in its most forward position towards the centre of the cam and consequently the work holder at the other end of the beam 111 will be at its maximum distance from the cutter. As tne cam rotates, said roller 115 is progressively pushed back by the cam 117, causing the work holder to advance towards the cutter, so that after an angular movement of the cam of about 90° the total feed is obtained whereafter normal progressive planing of the teeth takes place until the rotation of the blank to be cut is completed.

When the cam has described a complete turn, which will correspond to a little more than one turn of the wheel to be cut, the roller 115 will once more engage the receding part of the cam and the work holder 103 together with the cut blank or gear will be moved rapidly away from the cutter.

Both the movement of feed and the alternating movement of the work holder at each stroke of the cutter are exactly rectilineal, the holder being guided by the slide 102. The beam 111 can follow this movement, being capable of extension in the sleeve 113.

As the framework and secondary parts of the machine are of normal construction they are not described or illustrated.

Of course, a machine embodying the features of the invention can be constructed to operate simultaneously on any number of independently supported blanks, for each of which mechanism such as described with reference to Figs. 8–11 would be provided. The disposition, shape and the number of operative agencies may vary from those herein described to suit the requirement of practice without departing from the scope of the invention as defined by the claims which follow.

What I claim is:

1. In a machine for cutting gear by generating action the combination with a reciprocating gear cutter consisting of a pinion having teeth with a profile conforming to the profile of the teeth to be cut and the same modulus pitch as the gear to be formed, of means for rotating said pinion progressively, a plurality of independent supports for the gear blanks and of means for imparting to said blanks three combined movements comprising means for imparting simultaneously to the said blanks a radial rectilinear movement towards and away from the cutting position, means for rotating simultaneously the blank supports in such ratio to the rotary movement of the cutter that the blanks and the cutter turn together as if they were effectively in mesh and means for imparting simultaneously to said blanks a progressive feed movement radially towards the cutter.

2. In a machine for cutting gear by generating action the combination with a reciprocating gear cutter consisting of a pinion having teeth with a profile conforming to the profile of the teeth to be cut and the same modulus pitch of the gear to be formed, of means for rotating said pinion progressively, a plurality of independent supports for the gear blanks, and means for imparting to said blanks three combined movements comprising means for imparting simultaneously to the said blanks a radial rectilinear movement towards and away from the cutting position, means for rotating simultaneously the blank supports in such ratio to the rotary movement of the cutter that the blanks and the cutter turn together as if they were effectively in mesh, means for first bringing simultaneously the blanks into a position such as to obtain a rough cutting of the gears and means for successively carrying the rough cut blank simultaneously into a position such as to finish the gear.

3. A gear cutting machine, comprising a cutter having the form of a pinion to be cut, means to reciprocate and simultaneously rotate the cutter, a plurality of gear blank supports grouped around the axis of the cutter, a slide for each gear blank support, means for moving the slide radially relative to the axis of the cutter comprising a composite beam having one part jointed to the slide, a double eccentric on the other part of the beam, means to rotate the eccentric synchronously with the reciprocal movement of the cutter, a rocker arm, rollers mounted in the latter bearing on the eccentric, and a rotatory cam bearing on the rollers, said eccentric and cam arranged to effect oscillation of the beam and produce a superposed radial feed movement of the gear blank support.

In testimony that I claim the foregoing as my invention, I have signed my name.

GUIDO FORNACA.